US008572233B2

(12) United States Patent
Yu et al.

(10) Patent No.: US 8,572,233 B2
(45) Date of Patent: Oct. 29, 2013

(54) METHOD AND SYSTEM FOR SITE PATH EVALUATION USING WEB SESSION CLUSTERING (75) Inventors: Qingfeng Yu, Austin, TX (US); Choudur K. Lakshminarayan, Leander, TX (US); Alan Benson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2017 days.

(21) Appl. No.: 10/891,989

(22) Filed: Jul. 15, 2004

(65) Prior Publication Data
US 2006/0015504 A1  Jan. 19, 2006

(51) Int. Cl.
G06F 15/173 (2006.01)

(52) U.S. Cl.
USPC ........................................................ 709/224

(58) Field of Classification Search
USPC ......... 709/203, 223, 224, 217, 219, 227, 228, 709/229; 707/6, 7, 10
See application file for complete search history.

(56) References Cited

U.S. PATENT DOCUMENTS

| 5,668,988 | A | | 9/1997 | Chen et al. |
| 5,752,243 | A | | 5/1998 | Reiter et al. |
| 5,826,031 | A | | 10/1998 | Nielsen |
| 5,870,559 | A | * | 2/1999 | Leshem et al. ................ 709/224 |
| 5,931,912 | A | | 8/1999 | Wu et al. |
| 6,018,619 | A | * | 1/2000 | Allard et al. .................. 709/224 |
| 6,052,730 | A | * | 4/2000 | Felciano et al. .............. 709/225 |
| 6,151,630 | A | | 11/2000 | Williams |
| 6,510,457 | B1 | | 1/2003 | Ayukawa et al. |
| 6,836,773 | B2 | * | 12/2004 | Tamayo et al. ................ 707/6 |
| 6,963,874 | B2 | * | 11/2005 | Kasriel et al. ................. 707/10 |
| 6,981,040 | B1 | * | 12/2005 | Konig et al. .................. 709/224 |
| 7,043,475 | B2 | * | 5/2006 | Heer et al. ..................... 707/6 |
| 7,260,643 | B2 | * | 8/2007 | Chi et al. ....................... 709/238 |
| 7,287,028 | B2 | * | 10/2007 | Lee ................................ 707/6 |
| 2002/0063735 | A1 | * | 5/2002 | Tamir et al. ................... 345/745 |
| 2002/0078191 | A1 | * | 6/2002 | Lorenz .......................... 709/223 |
| 2002/0198882 | A1 | | 12/2002 | Linden et al. |
| 2003/0132957 | A1 | | 7/2003 | Ullmann et al. |

OTHER PUBLICATIONS

Srivastava et al., "Web Usage Mining: Discovery and Applications of Usage Patterns from Web Data"; Jan. 2000; University of Minnesota Dept. of Computer Science and Engineering; vol. 1, Issue 2, p. 12-23.*

Dasgupta S., Experiments with Random Projection, In Proceedings of the 16th Conference on Uncertainty in Artificial Intelligence, pp. 143-151, Stanford CA Jun. 30-Jul. 3, 2000.

Agrawal et al., "Fast Discovery of Association Rules," Advances in Knowledge Discovery and Data Mining, AAAI/MIT Press, Cambridge, MA, 1995, pp. 307-328.

* cited by examiner

Primary Examiner — Hee Soo Kim (57) ABSTRACT

A method and system for site path evaluation using web session clustering is provided. The method identifies properties of a plurality of web site traversal paths. Data is acquired from a plurality of sessions corresponding to at least a portion of the plurality of web page traversal paths. Portions of the web site traversal paths are grouped into a unified web page category. The plurality of sessions is clustered into a plurality of web session clusters according to a similarity measure. One of the plurality of web session clusters most closely exhibiting at least one predefined metric is selected for analysis of the propertied of a web page traversal path contained therein. A system includes a plurality of web pages, a monitoring program and a computational process configured to receive data and identify properties of the plurality of traversal paths.

14 Claims, 9 Drawing Sheets

Must Link Sets: {u1, u2}, {u3, u4}
Must Not Link Sets: {u5, u6, u7}

FIG. 4

Traffic Information Available
Must Link Sets: {u1, u2}, {u3, u4}
Must Not Link Sets: {u5, u6, u7}

FIG. 5

|   | url_id | page | ProductLine ID | Family ID |
|---|---|---|---|---|
| 1 | 1169 | /dstore/ctobases.asp | 430 | 1291 |
| 2 | 1164 | /dstore/configurationn.asp | 430 | 1219 |
| 3 | 1169 | /ctobases.asp | 430 | 1214 |
| 4 | 1171 | /configurationn.asp | 430 | 1219 |
| 5 | 1187 | /dstore/configurationn.asp | 430 | 1291 |
| 6 | 1188 | /dstore/ctobases.asp | 493 | 1367 |
| 7 | 1195 | /dcart/cart.asp | 430 | 1316 |
| 8 | 1197 | /dstore/configurationn.asp | 430 | 1316 |
| 9 | 1203 | /dstore/ctobases.asp | 429 | 1289 |
| 10 | 1210 | /dstore/ctobases.asp | 435 | 1560 |
| 11 | 1213 | /dcart/cart.asp | 430 | 1291 |
| 12 | 1214 | /dstore/ctobases.asp | 433 | 1466 |
| 13 | 1215 | /dstore/subfamilies.asp | 431 | 1435 |
| 14 | 1225 | /configurationn.asp | 430 | 1232 |
| 15 | 1228 | /dstore/subfamilies.asp | 435 | 962 |
| 16 | 1229 | /dcart/cart.asp | 431 | 1176 |
| 17 | 1230 | /dstore/ctobases.asp | 492 | 1297 |

*FIG. 6*

| | page_cluster | URL (domain ommitted) | frequency |
|---|---|---|---|
| 1 | 1 | cart.asp?from=cto&productlineid=4308&familyid=1316&baseid=7272&headeracti... | 7 |
| 2 | 1 | cart.asp?oi=e9ced&beid=19701&sblid=&esttax=$108.25&estshipping=$5.15&est... | 1 |
| 3 | 1 | cart.asp?from=cto&productlineid=4308&familyid=1316&baseid=7230&headeracti... | 12 |
| 4 | 1 | cart.asp? from=cto&productline id=4308&familyid=1316&baseid=7274&headeracti... | 3 |
| 5 | 1 | cart.asp? from=cto&productline id=4308&familyid=1316&baseid=7589&headeracti... | 9 |
| 6 | 1 | cart.asp?qt=320 digits1 camera&hp1=search_criteria=&search=keyword & sea... | 1 |
| 7 | 2 | cart.asp?oi=e9ced&beid=19701&sblid= | 417 |
| 8 | 2 | cart.asp?o1=e9ced&beid=19701&sblid=&esttax=$245.20&estshipping=$18.31&es... | 1 |
| 9 | 2 | cart.asp?headeraction=viewcart?oi=e9ced&beid=19701&sblid= | 299 |
| 10 | 2 | cart.asp?oi=e9ced&beid=19701&sblid=&est tax=$23.76&est shipping=$7.51&ests... | 3 |
| 11 | 2 | cart.asp?oi=e9ced&beid=19701&sblid=&est tax=$9.97 &est shipping=$8.23&estsh... | 1 |
| 12 | 2 | cart.asp? oi=e9ced&beid=19701&sblid=&est tax=$0.00 &est shipping=$22.20&ests... | 1 |
| 13 | 19 | cart.asp? oi=e9ced&beid=19701&sblid=&est tax=$67.18 &est shipping=$20.70&est... | 1 |
| 14 | 19 | cart.asp?from=cto&product line id=430 & family id=1524&baseid=8441&headeracti... | 2 |
| 15 | 19 | cart.asp?oi=e9ced&beid=19701,,&sblid | 1 |
| 16 | 19 | cart.asp?from=cto&product line id=430&family id=1524&base id=8440 & headeracti... | 16 |
| 17 | 19 | cart.asp?from=cto&product line id=430&family id=1524&base id=8442 & headeracti... | 4 |
| 18 | 19 | cart.asp?from=cto&product line id=430&family id=1524&base id=8440 & headeracti... | 9 |

FIG. 7

| Session Cluster | Number of sessions | Average Revenue | Average Sequence Length | Average Within-Cluster Similarity |
|---|---|---|---|---|
| 0 | 64 | 1011.12 | 54 | 57.17 |
| 1 | 62 | 1802.03 | 62 | 51.45 |
| 2 | 61 | 1468.68 | 22 | 51.95 |
| 3 | 65 | 1710.94 | 12 | 55.04 |
| 4 | 63 | 1375.82 | 22 | 52.04 |

*FIG. 8*

| Cluster | Open Sequence Set | Frequency |
|---|---|---|
| 0 | 123 306 2 101 265 438 377 | 25 |
| 0 | 306 123 2 101 265 438 377 | 18 |
| 1 | 124 2 101 265 | 16 |
| 1 | 2 101 265 137 | 18 |
| 2 | 155 251 2 101 265 438 377 | 13 |
| 2 | 201 155 251 101 265 438 377 | 11 |
| 3 | 124 2 101 265 438 377 | 11 |
| 3 | 144 2 101 265 438 377 | 20 |
| 4 | 123 2 101 265 438 377 | 17 |
| 4 | 2 123 101 265 438 377 | 14 |

*FIG. 9*

| Session Cluster | Number of sessions | Average Revenue | Average Sequence Length | Average Within-Cluster Similarity |
|---|---|---|---|---|
| 0 | 63 | 1871.13 | 19 | 57.17 |
| 1 | 62 | 1153.54 | 50 | 51.45 |
| 2 | 61 | 2101.87 | 27 | 51.95 |
| 3 | 65 | 1194.17 | 15 | 55.04 |
| 4 | 63 | 1063.19 | 33 | 52.04 |

*FIG. 10*

| Cluster | Open Sequence Set | Frequency | Interpretations |
|---|---|---|---|
| 0 | 348 144 34 6 | 25 | Product X2 from promotion to ctobases to configurator |
| 1 | 221 170 296 35 | 16 | Product X2 carrying case to home to family to ctobases |
| 2 | 170 296 | 11 | Home to product X1 family |
| 3 | 409 71 | 11 | Product X1 family promotion to subfamily baseid 1237 |
| | 409 137 | 20 | Product X1 family promotion to subfamily baseid 1236 |
| | 409 170 | 17 | Product X1 family promotion to another Product Line X2 |
| | 409 332 | 14 | Product X1 family promotion to saveorder |
| | 296 170 | 14 | Product X1 family to home |
| 4 | 170 296 | 24 | Home to product X1 family |

*FIG. 11*

| Cluster Label | Cluster Size | Convergence | Top 5 Open sequences with their frequency |
|---|---|---|---|
| 1 | 1261 | 0.1126 | 1270(40), 1320(34), 1023(31), 3120(27), 1204(26) |
| 2 | 1262 | 0.1062 | 2703(13), 12704(13), 12703(12), 18270(11), 27041(11) |
| 3 | 1262 | 0.0412 | 1270(14) |
| 4 | 1263 | 0.0340 | 120(88), 102(72), 127(64), 123(34), 132(26) |
| 5 | 1261 | 0.0079 | 120(15), 21[24](15), 130(12), 213(12), 210(12) |
| 6 | 1263 | 0.0095 | 2(1263) |
| 7 | 1261 | 0.0063 | 120(73), 210(19) |
| 8 | 1262 | 0.0777 | 70(22), 20(15), 27(14) |
| 9 | 1262 | 0.0040 | 30(35) |
| 10 | 1262 | 0.0016 | 20(66), 70(52), 01(44), 02(43), 60(12) |

METHOD AND SYSTEM FOR SITE PATH EVALUATION USING WEB SESSION CLUSTERING

BACKGROUND OF THE INVENTION

On-line retailers promote, sell, and provide a variety of pertinent information on their respective web sites. Whether products, services, company information, support links or otherwise, all such links are offered through the web site which results in a significantly large quantity of web pages. Due to the vast quantity of candidate web pages, possible traversal paths are significant. While the possible traversal paths may be abundant, specific traversal paths may result in preferred outcomes, such as in the consummation of a purchase of goods or services on the web site.

BRIEF SUMMARY OF THE INVENTION

In one embodiment of the present invention, a method is provided for identifying properties of a plurality of web site traversal paths. Data is acquired from a plurality of sessions corresponding to at least a portion of the plurality of web page traversal paths. Portions of the web site traversal paths are grouped into a unified web page category. The plurality of sessions, at least one of which includes a unified web page category, is clustered into a plurality of web session clusters according to a similarity measure. One of the plurality of web session clusters most closely exhibiting at least one predefined metric is selected for analysis of the propertied of a web page traversal path contained therein.

In another embodiment of the present invention, a system for extracting properties from data includes a web site including a plurality of web pages. A browser is configured to request and receive ones of the plurality of web pages as requested. The system further includes a monitoring program configured to receive data identifying each of the ones of said plurality of web pages received by the browser during a session causing a web site traversal path through the plurality of web pages for a session and to forward the data. A computational process is configured to receive the data and in conjunction with other data and identify the properties of the plurality of traversal paths.

In yet another embodiment of the present invention, a computer-readable medium having computer-executable instructions for identifying properties of a plurality of web site traversal paths is provided. The computer-executable instructions are configured to acquire data from a plurality of sessions corresponding to at least a portion of the plurality of web page traversal paths; group at least a portion of one web site traversal path; cluster the sessions into web session clusters; and select a cluster exhibiting a predefined metric of interest for analysis of the properties of the web site traversal path contained therein.

Other features and advantages of the present invention will become apparent to those of skill in the art through a consideration of the ensuing description, the accompanying drawings, and the appended claims.

BRIEF DESCRIPTION OF THE SEVERAL VIEWS OF THE DRAWINGS

In the drawings, which illustrate what is currently considered to be the best mode for carrying out the invention:

FIGS. 6 through 12 are exemplary test data subjected to the various processes and methods described herein, and in accordance with one or more of the various embodiments of the present invention.

DETAILED DESCRIPTION OF THE INVENTION

Figure 1:
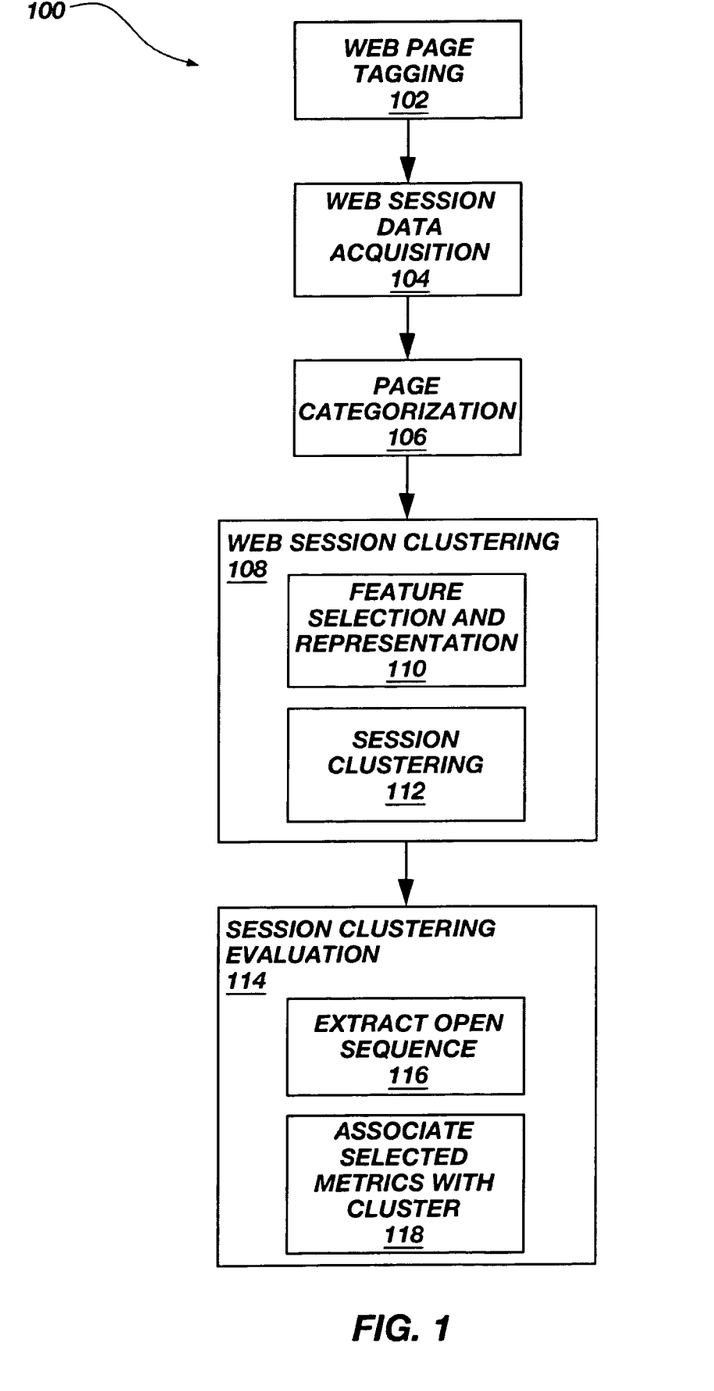
FIG. 1 is a process flow diagram for configuring a web site for acquiring data and processing the data to determine efficiencies of a web site, in accordance with a embodiment of the present invention.

In accordance with the one or more embodiments of the present invention, a framework is described for extracting interpretable results from web session clustering of web usage data. The described framework includes various phases or process stages as described hereinbelow. Specifically, FIG. 1 is a process flow diagram for configuring a web site for acquiring data and processing the data to determine efficiencies of a web site, in accordance with an embodiment of the present invention. The various stages or processes, including tagging, data acquisition, page categorization and clustering are individually described hereinbelow with reference to the various figures, including FIG. 1. The process flow of FIG. 1 is performed by execution of computer-executable instructions provided on a computer-readable medium that includes a hardware storage component such as RAM, ROM, EEPROM, CD-ROM, or other optional disk storage or magnetic disk storage.

Web Site Tagging and Web Session Data Acquisition

While an appreciable amount of web usage mining data is available from conventional server side logs, certain navigation patterns cannot be captured, such as backtracking through a browser having previously displayed web pages. Furthermore, requests for URLs cached locally or at proxy servers may be unavailable as part of the server side logs. Therefore, in order to retrieve useful information such as cached URLs and certain navigation patterns, the various embodiments of the present invention employ, for example, a remote agent operating a monitoring program for every user for sending session information back to the server, which has an agent such as a web site database to collect such data.

Figure 2:
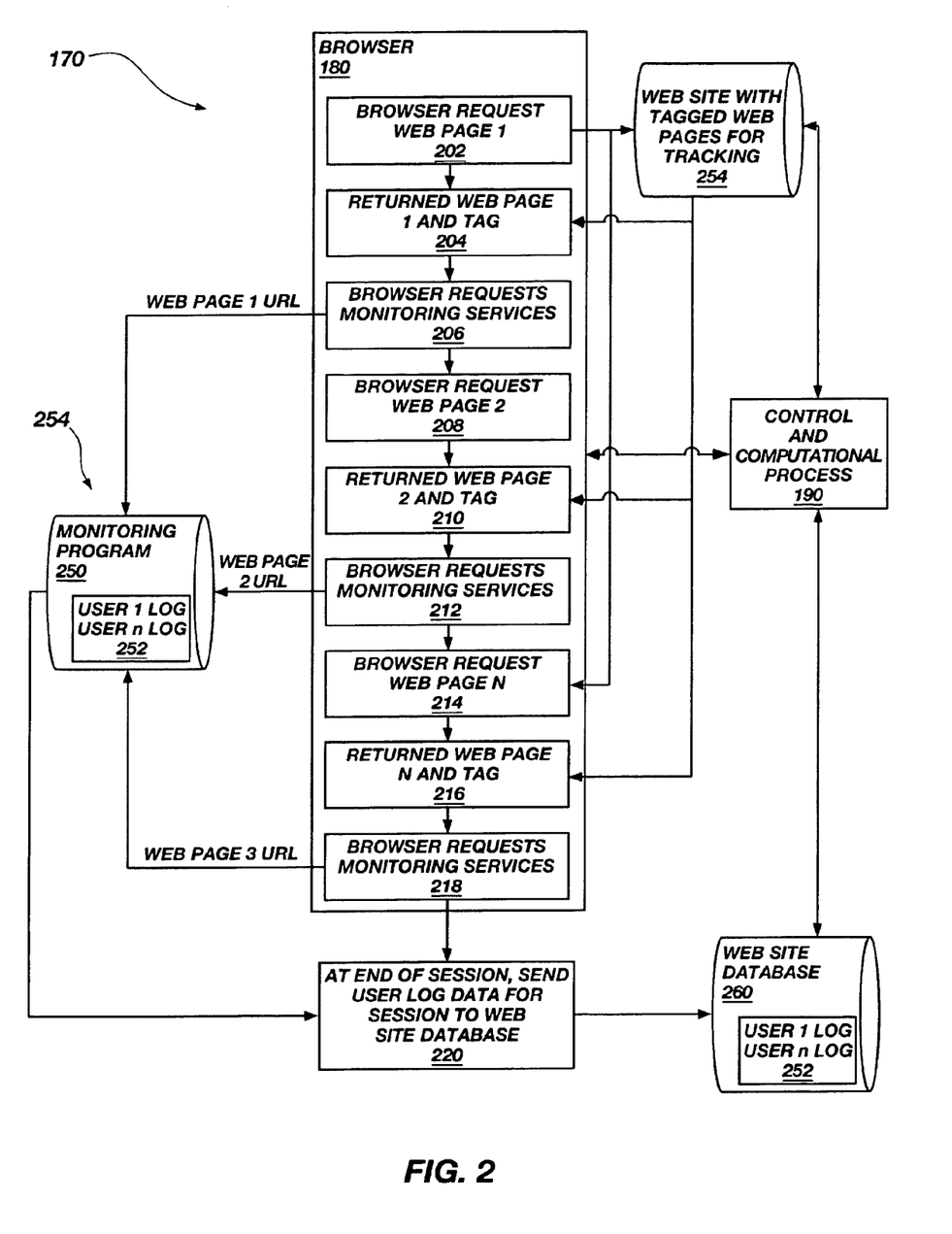
FIG. 2 is a process flow of a data acquisition process for capturing a user log for analysis, in accordance with an embodiment of the present invention.

In accordance with an embodiment of the present invention, FIG. 2 is a flow diagram, as performed by a control and computational process 170, of one data acquisition process 104 which may utilize a monitoring program 250 by embedding 102 an agent or tag in pages (tagging), which, by way of example and not limitation, may be a Java script fragment. By way of example and not limitation, when a user's browser first requests 202 a page from a web site 254, the Java script fragment and the web page are returned 204 to the browser. The browser interprets the Java script to further request 206 a monitoring program 250 from the third party server 254, at which time the visitor's on-line behavior continues 208-216 until the browser is shut down or the session times out. Acquired session information such as a user log 252 is then sent 220 to the web site server 260 to be stored in, for example, a SQL database as multiple tables.

In an applied embodiment of the present invention, there are at least two notable characteristics for gathered data. First, there may be huge amounts of various types of data available, for example, session properties such as session id, page URL, page sequence number, page duration in a given sequence, and also associated user profile like browser type, operating system version, screen resolution, color depth, etc. Second, such great volume and extensiveness of domain-specific data may burden web mining tools and impair the tools from running efficiently and effectively to extract interpretable results. Furthermore, it may be common that most of the attributes gathered may be incomplete and unstructured. Additionally, data types may include numeric, categorical and text string variables while occurrences of null values are quite common for most attributes. It should be noted that pre-processing the data to derive the attributes may be burdensome and involve significant effort in preparation for mining useful information. Furthermore, interpretation of the data may also require further attention and solutions, therefore, a categorization process.

Page Categorization

A page categorization process 106 (FIG. 1) prepares the data for a session clustering process. Instead of processing at the URL level for web sessions, in accordance with an embodiment of the present invention, URLs may be grouped into page categories. Furthermore, computational simplicity and interpretability may be achievable by processing at the page category level for sessions.

Figure 3:
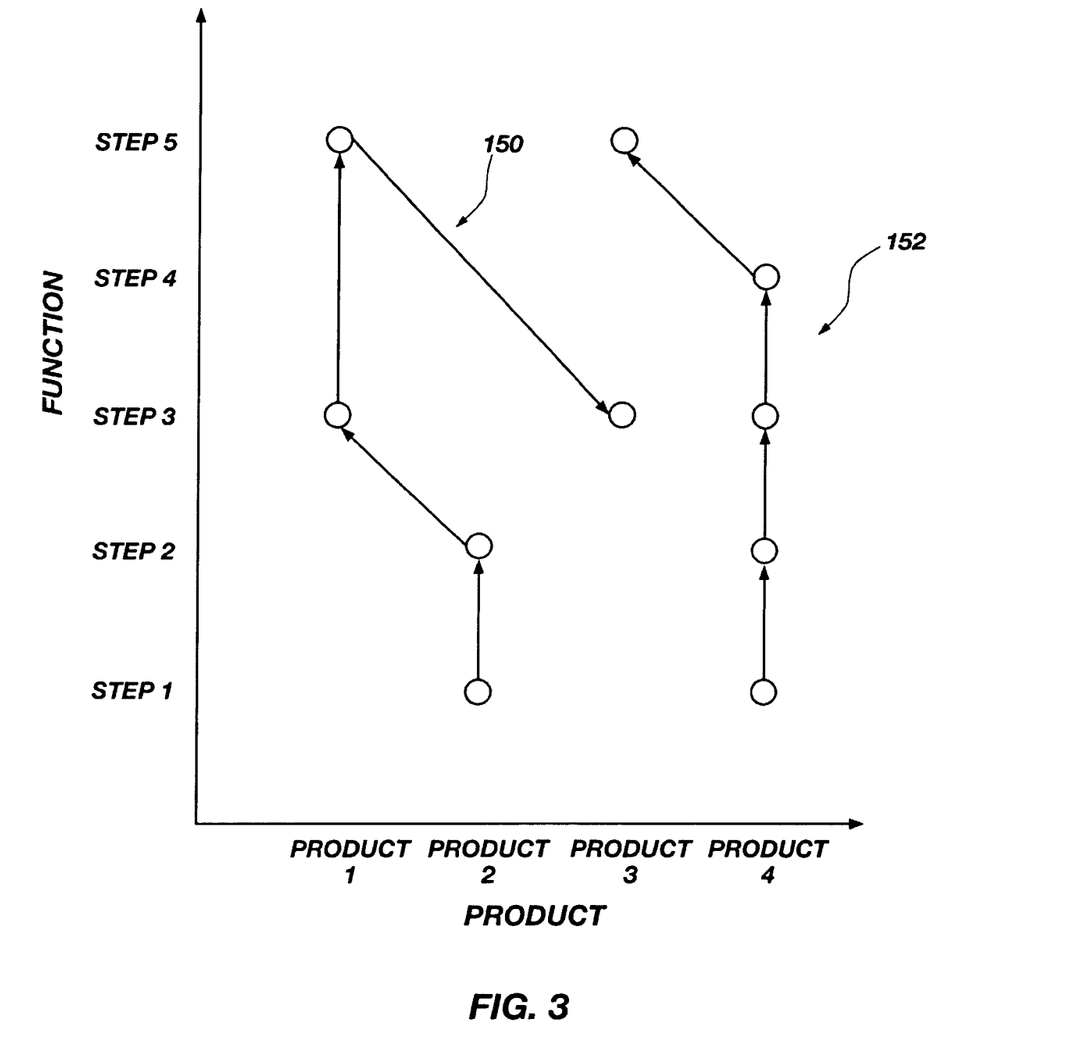
FIG. 3 illustrates a grid representation of two representative web sessions and the respective web page traversal paths.

Page categorization may also be thought of as concept formation where concept hierarchy is built from URL paths. Page categorization, in accordance with an embodiment of the present invention, maps each URL into a grid in the subspace spanned by product information and web site function pages. So a web session may be thought as a set of connected arrows describing transitions from one grid to another. For example, FIG. 3 illustrates first set of connected grids as transitions of a user for a chosen product moving along the function axis representing steps progressing toward a desired outcome such as the purchase of a product or service. The functionality may begin, for example, at an introduction step_1 for a specific product_n and move to, for example, configuration of the product and so forth to a store in a "shopping basket" step_s and then to another product page. Two separate sequences 150, 152 are illustrated by way of example. In sequence 150, the user tended to jump around from product to product while in sequence 152, the user tended to incrementally sequence along the function path while generally remaining within the product category. This scheme is designed to aid interpretability in the evaluation of clusters formed wherein similarities in the sessions are sought from the page transitions.

Computationally, a page concept space is constructed by extracting content information from the web page URLs. When one or more of the various embodiments of the present invention are applied to a web site where domain knowledge is available, the map hierarchy may be further utilized. In accordance with the framework of an embodiment of the present invention, the URLs are used to extract content information, since most of the pages carry certain meaningful parameters in the URL string. Parameters such as Product Line and Family can express what product the page is related to, while page names (URLs excluding other extraneous parameters) capture the sage in the browsing sequence. Although the page's HTML content contains more accurate information about the product and other related information, it may be quite difficult to extract relevant parameters without applying complex text mining technologies. URL strings are reasonably susceptible to parsing and processing into useful content information.

In applied situations where URLs do not carry desired parameters or that the corresponding URL values are simply missing or invalid due to problems with human error and instrumentation, then click-stream data may be gathered for the set of web sessions. One specific example of such data includes traffic information which provides a generally acceptable proxy for the link structure among the URLs. Categories may be formed when two URLs cannot be related by available content information by forming a relationship based on the amount of traffic, wherein heavy traffic means the two are more closely related, and may therefore be grouped together. While heavy traffic is common between navigation pages, key navigation pages are generally identifiable from their page names, such as index.html, home.asp, etc.

Figure 4:
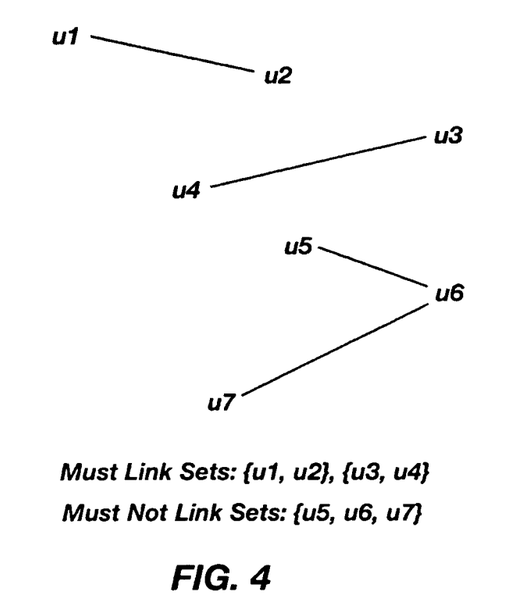
FIGS. 4 and 5 are traffic graphs identifying traffic between nodes of the graph, in accordance with an embodiment of the present invention.
Figure 5:
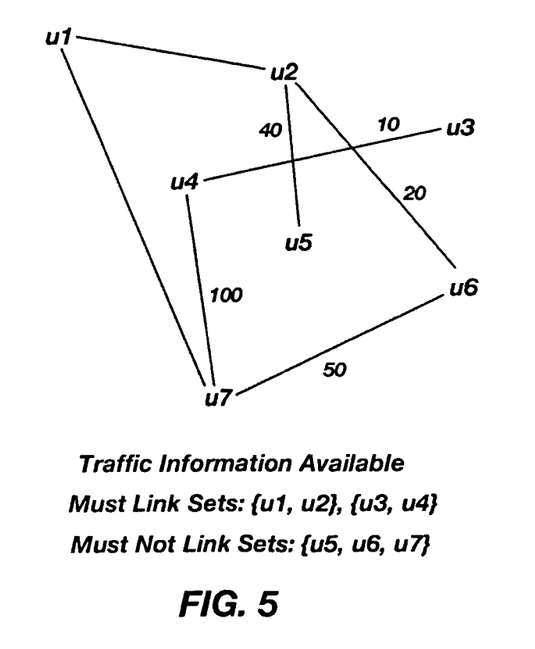
Figure 6:
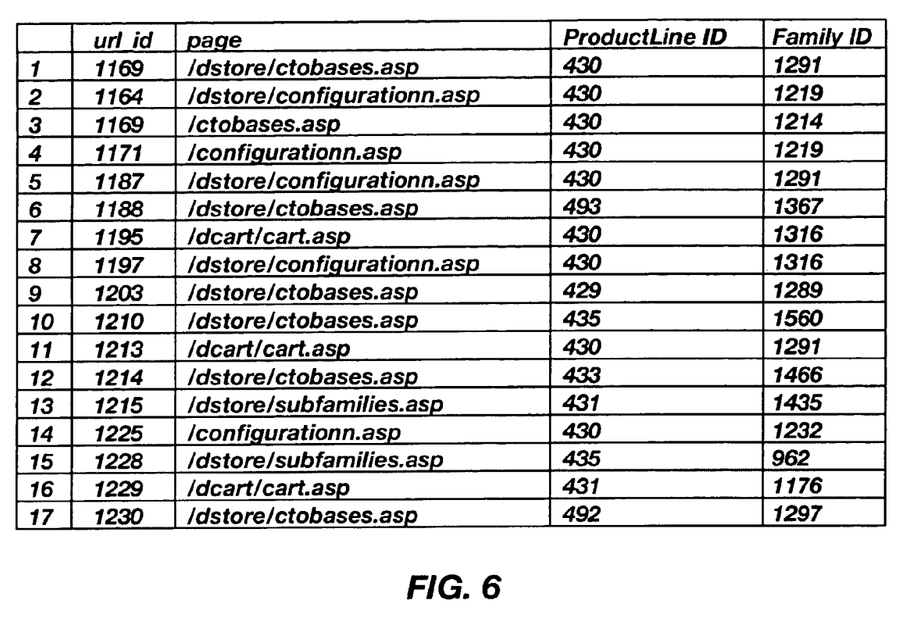

A page concept hierarchy is constructed from web sessions by building a traffic graph where every node is a unique URL and every edge is the traffic between the two connected nodes. Then, a content graph is built from URLs, where nodes are URLs, and edge weights are, for example, either +1 or −1 denoting must-link or must-not-link, respectively. An edge-weight value of +1, for example, is assigned for pages of similar content and −1 for dissimilar pages as shown in FIG. 4. No edge means unknown content information. Finally, the content graph is combined with the traffic graph by replacing the edge weights of the traffic graph by those in the content graph, as shown in FIG. 5. The resulting graph is called connectivity graph, which is a mixture of content and traffic information used to build connections between URLs that are either similar in content (in terms of URL and its associated parameters), or connected by heavy traffic in case of unknown content information. In an attempt to emphasize the different steps and different products in a complete purchase process, the connectivity of dissimilar URL pairs are penalized by removing their connectivity or applying a negative edge weight. On the other hand, large weights are assigned to the connectivity between two URLs belonging to the same product and same purchase stage. In both cases, the content information overwrites the traffic information. Finally, any graph partition method may be applied to the combined connectivity graph to get page clustering in either a hierarchical or a partitioning approach.

Web Session Clustering

Following page categorization (e.g., page clustering), the original sessions can be mapped into new sessions in the constructed concept space. Then, some of the adjacent-elements in the mapped sessions can be merged together. The resulting sessions generally should have a considerably smaller length and greatly reduced alphabet size. Web session clustering process 108 (FIG. 1) generally forms site paths for evaluation.

Specifically, a feature selection and representation process 110 (FIG. 1) determines the kinds of information that are useful in characterizing the web session navigation patterns or site paths. Representation of features in a data structure may be according to a variety of attributes including page access frequency, order of the page access, time spent on each page in the sequence. The selection of desirable feature set and data structure may very by application. While it is desirable to collect and process as much information as possible, for computational realities, it is practical to select one or more of the best or better distinguishing features to lessen the computational burden for an application. In one embodiment of the present invention, the selected feature includes the order of sequence information for the session clustering task with every session represented as a string of page categories.

A session clustering process 112 (FIG. 1) may be performed in one or more manners depending upon the data model of the sessions. In one exemplary approach, a distance is defined or a similarity measurement is derived between two sessions followed by the selection of a proper partition algorithm to arrive at the session clustering. In an alternative exemplary approach, an abstract model may be trained for a group of sessions and then the model may be used to perform model-based clustering.

According to an exemplary embodiment of the present invention, session clustering utilizes a pair wise sequence alignment method as commonly applied to in bioinformatics theory, the specifics of which are known by those of ordinary skill in the art. Generally, it is that for every pair of sessions, the edit distance between them is defined as the cost of an optimal alignment of the two sessions under unit cost function. Dynamic programming is applied to efficiently compute the optimal alignment and its cost. Although the dynamic programming costs are on the order of $n^2$ in complexity in order to compute the string edit distance, typical web site analysis applications of the various embodiments of the present invention utilize much shorter sequences than gene sequences in the bioinformatics applications. Since the page categorization or page clustering process decreased the size of alphabet set of the sequence, and the merger of adjacent sequence elements further reduced the sequence length. Once we have the session distance defined, a similarity matrix is computed for all sessions and then available graph partition methods are applied, an example of which is the Metis session clustering algorithm, the specifics of which are known by those of ordinary skill in the art.

Session Clustering Evaluation

Session clustering evaluation process 114 involves analysis of at least two aspects of the processed session data. First, extraction of an open sequence process 116 from each cluster which is representative of a typical sequence for the cluster. An open sequence is defined as a frequent sequence which appears in the web sessions as a whole sequence or substring of the original sequences. Such an open sequence is very similar to the most frequent item set concept in what has come to be known as the "market basket analysis" literature, the specifics of which are known by those of ordinary skill in the art.

In an embodiment of the present invention, the order of the element is further considered to obtain an open sequence. Specifically, an APRIORI algorithm is adapted, an example of which is available in the publication, "Fast Discovery of Association Rules," (Authors: R. Agrawal, H. Mannila, R. Srikant, H. Toivonen and A. Verkamo, Advances in Knowledge Discovery and Data Mining, AAAI/MIT Press, Cambirdge, Mass. 1995), herein incorporated by reference. The APRIORI algorithm identifies the most frequently occurring open sequences. After the open sequences are obtained, the entities within the sequence may be evaluated to grasp their content, by looking at those sequence elements, which are page categories from the page clustering process.

In accordance with an embodiment of the present invention, selected metrics may also be associated with the cluster. By way of example and not limitation, one exemplary set of useful metrics may include external metrics such as conversion (number of purchase over number of sessions), average revenue, and internal metrics such as within-cluster similarity (average pair-wise similarity of the sessions within a cluster), and average sequence length. In one example of a commercial web site, useful metrics identifying a "good" cluster may include high conversion rate, high average revenue, high within-cluster similarity and short average sequence length.

FIGS. 6-12 illustrate a specific example for a commercial web site, in accordance with an embodiment of the present invention. While commercial web sites are generally large and cumbersome to evaluate in their totality, a portion of a commercial web site may be independently evaluated. In the present example, a dataset is chosen from a specific part of a large commercial web site selling computer equipment and related products. Specific product information and parameter values are represented generically by symbols. By way of an applied example, the first dataset consists of all sessions that visited specific product X1 related pages over a two-week period and purchased. The entire dataset contains 315 sessions and 2303 URLs. The traffic graph has 4711 edges and after the integration of content information (FIG. 6), 1706 edges result in the page connectivity graph. The graph is sparse enough to implement graph partition methods, the specifics of which are known by those of ordinary skill in the art. Partitioning is performed using, for example, the Metis algorithm, incorporated hereinabove by reference. Using the Metis algorithm, k=500 page clusters are prepared, where k is selected arbitrarily close to an estimation of the number of concepts (in terms of combination of product and page functions). In the dataset, there are 320 pages (URLs excluding parameters), 14 distinct Product Line values and 91 distinct Family values. The number of distinct combinations of the three variables is 519, so the number of clusters to be partitioned could be set to 500.

Following the page categorization process, a table is created for each page cluster. It is expected to see similar pages and products for all rows in the table. A literal label may then be assigned for the page cluster. An example table of cluster 1, 2 and 19 is shown in FIG. 7. The frequency of the URLs appearing in the whole session dataset represents the strength of the URL corresponding to the page cluster. The assumption is that if a URL appears more often, then the corresponding page cluster is more likely to be mapped from this URL. So an easy interpretation of the page clusters is possible. In the following example, all the three page clusters are about page "cart.asp," but each with a different focus. Cluster 1 is mainly about Product Line X1 and Family Y1, which means a specific family of certain product X1. Cluster 19 is about another Family Y2 with the same Product Line X1. Cluster 2 is not related with any product, but a general page for carts.

Results from page partitioning are used to map the original sessions into a page category level. A session similarity graph is built with pair-wise alignment of sequences. The graph is again fed into a session clustering algorithm, such as the Metis algorithm, to perform the session clustering process. After the session clustering process, sessions are approximately equally divided, for example, into five groups. This cluster number is chosen more arbitrarily than the number of page clusters. The internal and external metrics are computed and the open sequences are extracted from every cluster to represent the typical sequences in that cluster. All open sequences are recorded that exhibit frequencies of more than ten. Results from the session clustering example are illustrated in FIGS. 8 and 9.

Figure 8:
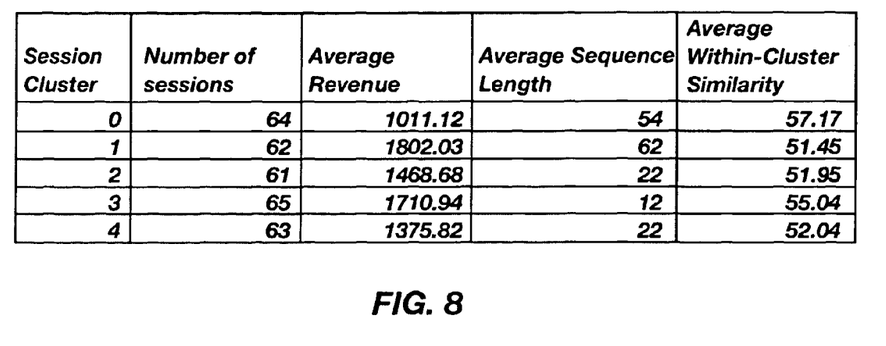

As illustrated in FIG. 8, cluster 3 exhibits favorable qualities, namely high average revenue, short sequence length and rather tight cluster shape. Investigating individual sessions in that cluster may reveal optimal paths for purchasing. Accordingly, all sessions within each cluster may be analyzed to interpret characteristics unique to that cluster, however, in one embodiment of the present invention, open sequences are used which represent "typical" sequences within the cluster.

Figure 9:
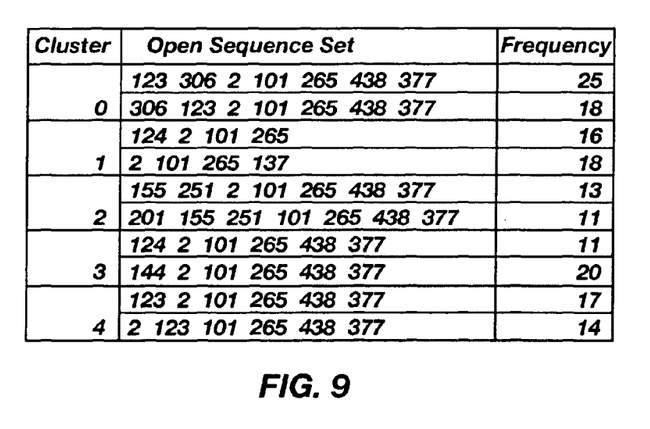
Figure 10:
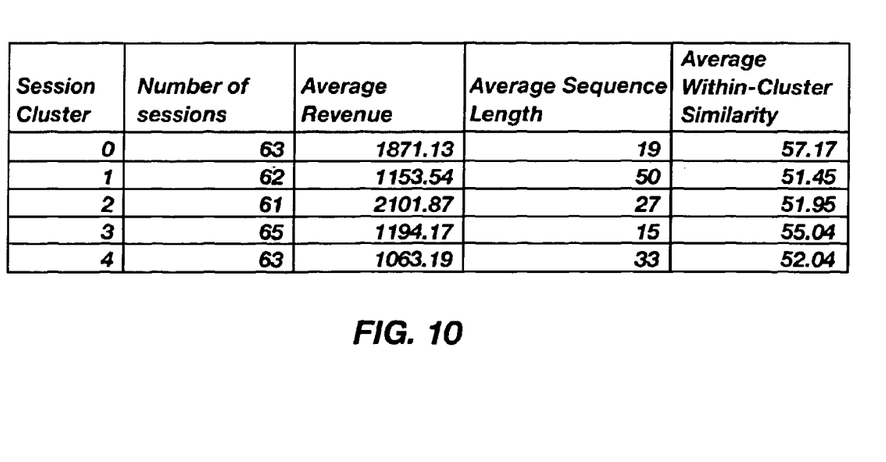

With reference to FIG. 9 and the corresponding page cluster interpretation in FIG. 7, the meaning of each open sequence for a cluster may be derived. For example, cluster 3's first sequence means going from page category 124 "product X1 category at a glance," to page category 2 "cart overview," to page category 101 "customer login," to page category 265 "display order information," and finally to page category 377 "order confirmation." It is evident that this sequence is a very clear purchase path; however, the latter part of it is a known purchase funnel. Clearly, all such clusters have similar paths except for their starting elements in the sequences which is as expected since the analysis is over all sessions that culminated in a purchase.

To discover unknown paths and distinguish clear navigation patterns, purchase path pages which every purchase must pass through may be trimmed, such as "login.asp," "confirmed.asp," etc. This trimming of the first dataset results in a trimmed version or second dataset. As previously observed, cluster 0 exhibits good revenue, short path and highest within-cluster similarity. One of the worst clusters may be cluster 1 which exhibits low revenue, longest path and low within-cluster similarity.

Figure 11:
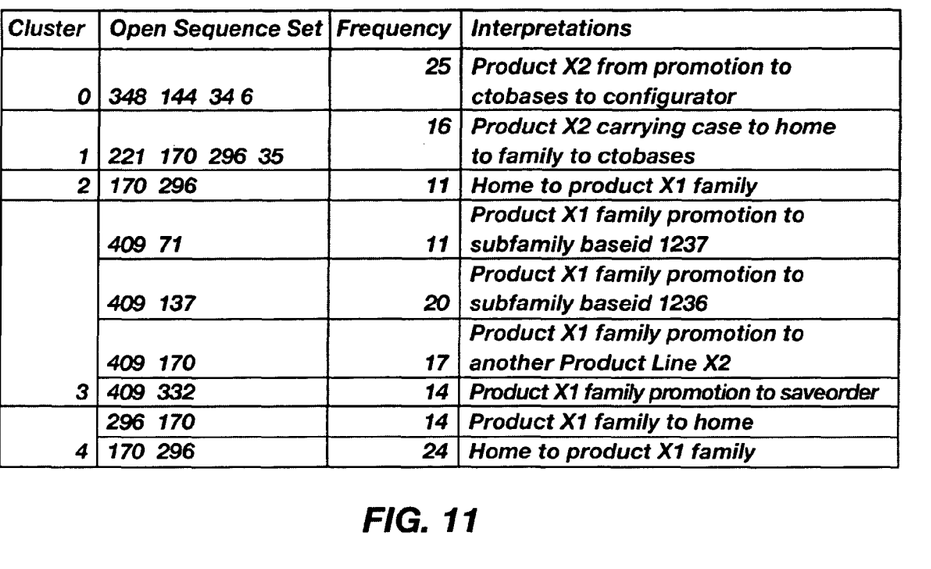

In FIG. 11, open sequences with frequencies over 10 are collected. As shown, the dataset in FIG. 11 provides better results over the dataset as illustrated in FIG. 9. Clear distinctions between clusters, except clusters 2 and 4 which have the same opening sequences, are evident. The table of FIG. 11 lists interpretations and results, for example, that the path in cluster 0, which may represent a path for product X2 on sale. Cluster 3 shows different paths visitors may follow to purchase product line X1 from different families.

The framework embodiment of the present invention was also applied to bigger datasets with 538 purchased sessions from product lines X1 and X2. The experiment showed similar results yielding clusters with distinguishable quality and open sequences of good interpretability. By further example, an additional test was performed on product X3 related to web session data spanning a one-week period. The whole dataset contains 12619 sessions and 32098 unique URLs. After the session clustering, sessions are approximately equally divided into ten groups. Then the mean conversion of each cluster is computed according to the session purchase information. Also, open sequences were extracted from every cluster to represent the typical sequences in that cluster.

Figure 12:
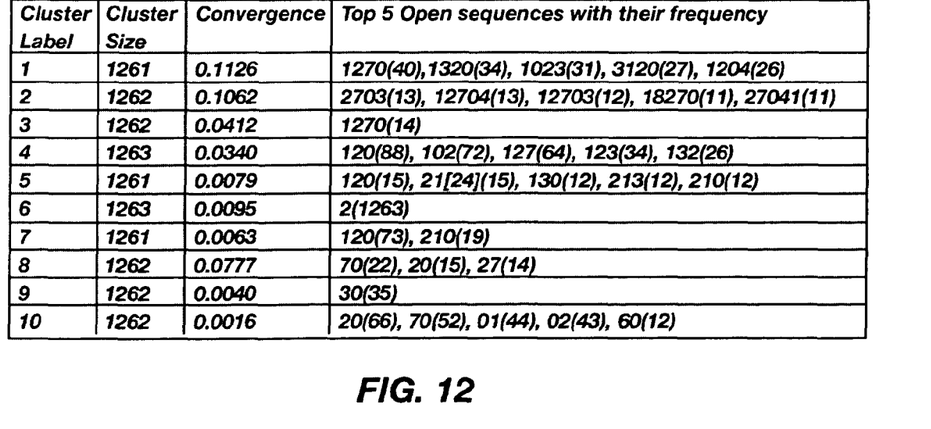

FIG. 12 illustrates the results from the processing the dataset in accordance with an embodiment of the present invention. (Note: the number in ( ) represents the sequence frequency and numbers before ( ) are sequences, where [ ] is used for page clusters whose number is bigger than 9.) In analyzing the results, clusters 3 and 4 are approximately the equivalent with regard to conversion, while clusters 1, 2, 8 are at least twice as good, while clusters 5, 6, 7, 9, 10 perform poorly with only approximately 20% average conversion. Analyzing the open sequences for every cluster, cluster 6 can be thought of as a cluster that just focuses on one specific page cluster 2. Similar sequences can be seen in different clusters, as the dataset was not trimmed.

Figure 13:
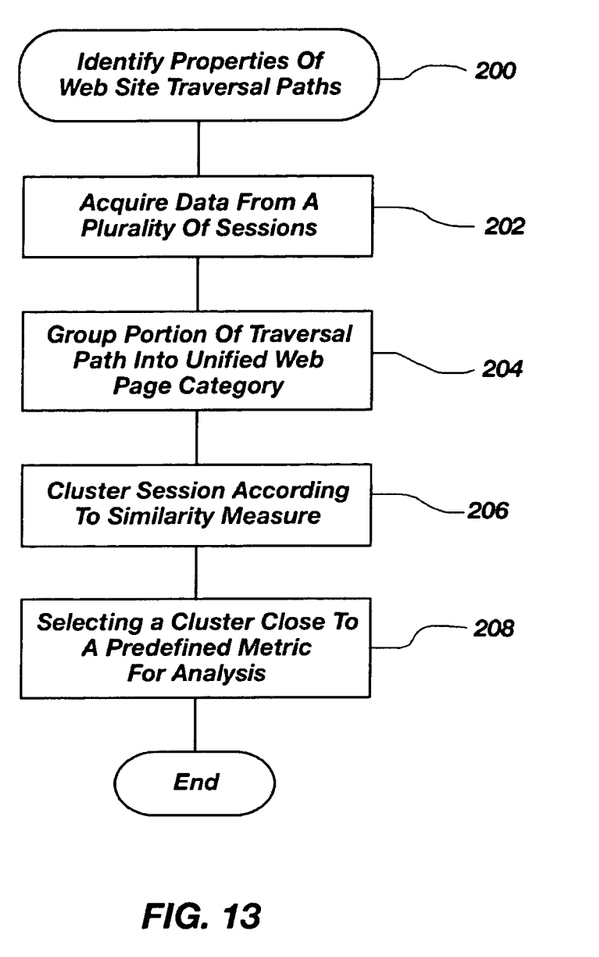
FIG. 13 is a flow diagram of a method of identifying properties of a plurality of web site traversal paths, in accordance with an embodiment of the present invention.

FIG. 13 is a flow diagram of a method of identifying properties of a plurality of web site traversal paths, in accordance with an embodiment of the present invention. A method 200 for identifying properties of a plurality of web site traversal paths includes acquiring 202 data from a plurality of sessions corresponding to at least a portion of the plurality of web page traversal paths. Portions of the web site traversal paths are grouped 204 into a unified web page category. The plurality of sessions are clustered 206 according to a similarity measure into a plurality o web session clusters. The plurality of web sessions includes a unified web page category. One of the plurality o web session clusters is selected 208 which most closely exhibits at least one predefined metric from the plurality of web session clusters. The selected cluster is analyzed to determine the properties of the web page traversal paths.

A framework for effective e-commerce web site visitor path evaluation has been described. The framework utilizes flexible page categorization methods taking advantage of both content and traffic information from the web session dataset. Additionally, open sequence concepts are utilized to identify typical sequences within every session cluster found and associate the cluster with important metrics, such as conversion.

What is claimed is:

1. A method for identifying properties of a plurality of web page traversal paths, comprising:
   acquiring data from a plurality of sessions corresponding to said plurality of web page traversal paths;
   grouping, by a computer, said web page traversal paths into web page categories, wherein grouping said web page traversal paths into said web page categories includes correlating traffic amount relationships between specific ones of a plurality of web pages in said web page traversal paths to identify said web page categories, wherein correlating the traffic amount relationships between the specific web pages comprises correlating the specific web pages based on an amount of traffic between the specific web pages;
   using, by the computer, the web page categories to map the plurality of sessions to new sessions;
   clustering, by the computer, said new sessions according to a similarity measure into a plurality of web session clusters, wherein clustering said new sessions comprises defining the similarity measure between sessions, and partitioning said new sessions into said plurality of web session clusters according to said similarity measure; and
   selecting, by the computer, one of said plurality of web session clusters most closely exhibiting at least one predefined metric from said plurality of web session clusters for analysis of properties of a web page traversal path contained therein.

2. The method of claim 1, wherein said acquiring data from the plurality of sessions, includes:
   acquiring data from a plurality of user logs corresponding to said plurality of web page traversal paths during the corresponding plurality of sessions.

3. The method of claim 2, wherein said acquiring data includes:
   tagging each web page of said plurality of web page traversal paths;
   for each of said plurality of sessions,
      forwarding a URL to a monitoring program to store as said data;
      said monitoring program compiling a user log for each of said plurality of sessions;
      upon completion of one of said plurality of sessions, forwarding said user log for compiling into said data from said one of said plurality of sessions.

4. The method of claim 3, wherein said tagging includes embedding a Java script fragment into each of said plurality of web pages.

5. The method of claim 1, wherein each of said plurality of sessions comprises at least one URL uniquely identifying a specific one of the plurality of web pages.

6. The method of claim 1, wherein grouping said web page traversal paths into said web page categories further includes parsing URL text strings identifying specific ones of the plurality of web pages.

7. The method of claim 1, wherein said partitioning comprises clustering said new sessions according to a pair wise sequence alignment algorithm.

8. The method of claim 1, wherein selecting the one of said plurality of web session clusters comprises:
- extracting an open sequence as a representative sequence from each of said web session clusters; and
- analyzing properties of a web page traversal path of said open sequence of each of said web session clusters.

9. The method of claim 8, wherein said open sequence is identified according to an APRIORI algorithm.

10. A non-transitory computer-readable medium having computer-executable instructions for identifying properties of a plurality of web page traversal paths, said computer-executable instructions executable for:
- acquiring data from a plurality of sessions corresponding to said plurality of web page traversal paths;
- grouping said web page traversal paths into web page categories, wherein grouping said web page traversal paths into said web page categories includes correlating traffic amount relationships between specific ones of a plurality of web pages in said web page traversal paths to identify said web page categories, wherein correlating the traffic amount relationships between the specific web pages comprises correlating the specific web pages based on an amount of traffic between the specific web pages;
- using the web page categories to map the plurality of sessions to new sessions;
- clustering said new sessions according to a similarity measure into a plurality of web session clusters, wherein clustering said new sessions comprises defining the similarity measure between sessions, and partitioning said new sessions into said plurality of web session clusters according to said similarity measure; and
- selecting one of said plurality of web session clusters most closely exhibiting at least one predefined metric from said plurality of web session clusters for analysis of properties of a web page traversal path contained therein.

11. The non-transitory computer-readable medium of claim 10, wherein grouping said web page traversal paths includes parsing URL text strings identifying specific ones of the plurality of web pages.

12. The non-transitory computer-readable medium of claim 10, wherein selecting one of said plurality of web session clusters comprises:
- extracting an open sequence as a representative sequence from each of said web session clusters; and
- analyzing properties of a web page traversal path of said open sequence of each of said web session clusters.

13. A method comprising:
- in plural sessions, sending requests from a browser to a web site for web pages of the web site, wherein the web pages include corresponding tags;
- in response to receiving a particular one of the web pages, the browser using the tag of the particular web page to request a monitoring service by a monitoring program separate from the web site;
- grouping, by a computer, URLs of the web pages into page categories, wherein grouping the URLs includes correlating traffic amount relationships between specific ones of the web pages to identify the page categories, wherein correlating the traffic amount relationships between the specific web pages comprises correlating the specific web pages based on an amount of traffic between the specific web pages;
- using, by the computer, the page categories to map the plural sessions to new sessions having reduced attribute information; and
- clustering, by the computer, the new sessions into clusters, wherein clustering the new sessions includes defining a similarity measure between sessions, and partitioning the new sessions into the clusters according to the similarity measure.

14. The method of claim 13, wherein mapping the plural sessions to new sessions includes performing feature selection to select features for characterizing the new sessions.

* * * * *